Nov. 18, 1930.                E. BROBERG                1,782,131
SHADE ROLLER BRACKET
Filed Dec. 14, 1927
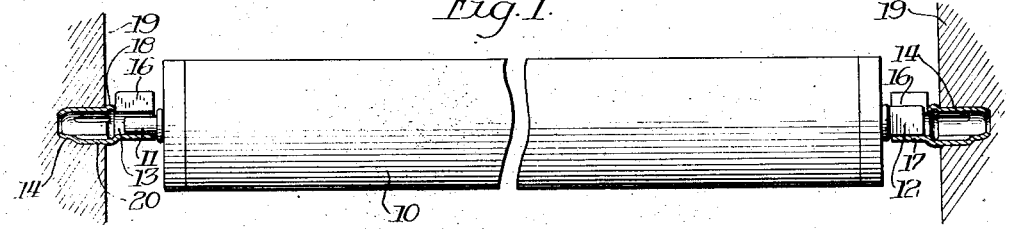
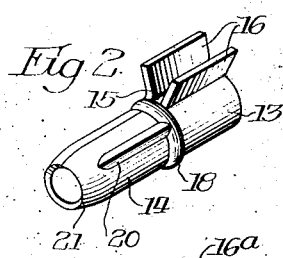 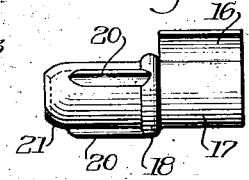 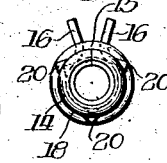 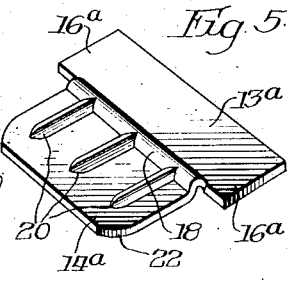
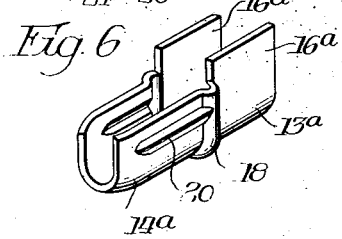 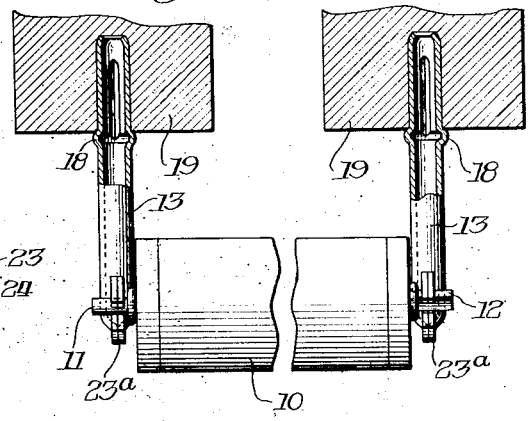
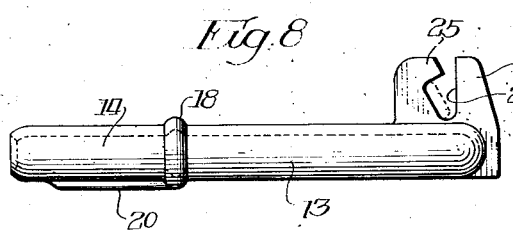
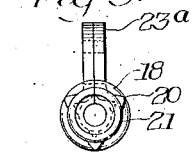 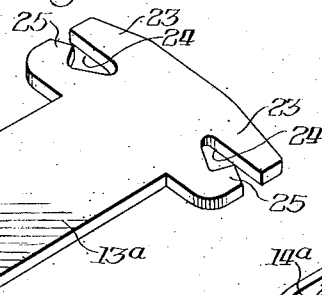 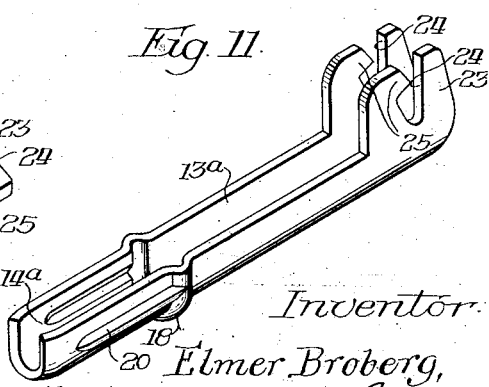
Inventor
Elmer Broberg,
By Chindahl, Parker & Carlson
Attys Patented Nov. 18, 1930

1,782,131

UNITED STATES PATENT OFFICE

ELMER BROBERG, OF ROCKFORD, ILLINOIS, ASSIGNOR TO ELCO TOOL AND SCREW CORPORATION, OF ROCKFORD, ILLINOIS, A CORPORATION OF ILLINOIS

SHADE-ROLLER BRACKET

Application filed December 14, 1927. Serial No. 239,852.

The invention relates to brackets particularly adapted for use with rollers for window shades.

The object of the invention is to provide a new and improved roller shade bracket of a character which may be used interchangeably to support either end of a shade roller and which may be manufactured simply and inexpensively from a single piece of sheet metal.

Another object of the invention is to provide an improved bracket of this character which may be easily, conveniently and accurately installed in place and which is inherently adapted to resist rotational displacement from its operating position.

Other objects and advantages will become apparent from the following detailed description and from the accompanying drawings, in which:

Figure 1 is an elevational view of a window shade roller in use with the invention showing the supporting brackets in longitudinal section.

Figs. 2 and 3 are perspective and elevational views respectively of a preferred form of the bracket.

Fig. 4 is an end view of the bracket looking toward the right of Fig. 3.

Figs. 5 and 6 are perspective views showing the manner of forming the bracket from sheet metal.

Fig. 7 is a plan view partially in section of a modified form of the bracket used in supporting a roller shade away from a wall.

Fig. 8 is an elevational view of the bracket shown in Fig. 7.

Fig. 9 is an end view looking toward the right of Fig. 8.

Figs. 10 and 11 are perspective views showing the manner of forming the modified bracket.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

In attaining the objects of the invention, a bracket has been provided which is adapted to be used interchangeably for either end of a shade roller. Since it is generally well known that one end of the ordinary shade roller 10 (Fig. 1) is provided with a round bearing pin 11, while the other end of the roller is provided with a flat pin 12 which must be held against rotation to insure the operation of the roller, it will be apparent that an interchangeable bracket must provide a receiving socket for the ends of the roller which will either provide a bearing for the round pin 11 or will engage the flat pin 12 to prevent rotation thereof.

In brackets of this character, the general usage is to mount the roller in brackets which face inwardly of the casement opening and are secured to both sides of the casement so that the roller is mounted within and extends between the sides of the casement.

In the preferred form, the bracket comprises an integral two part construction, one part of which provides a socket portion 13 for the reception of the pins 11, 12 on the shade roller and the other end providing an anchoring stem portion 14 for securing the bracket in a wall. The socket portion is substantially tubular in form and is provided on one side with a longitudinal slot 15. Preferably, a pair of flanges 16 extend outwardly from the margins of the longitudinal slot and flare away from each other to provide a substantially V-shaped guiding means for directing the end of the roller into the socket. The longitudinal slot 15 is of a size to receive relatively snugly the flat pin 12 on the shade roller so that once the pin has been positioned in the bracket there will be a slight binding pressure thereon to prevent accidental displacement of the pin from the socket.

The anchoring stem portion 14 of the bracket is formed integrally with the socket portion and preferably is separated therefrom by means of an annular bead 18 so positioned as to determine or designate the distance which the anchoring stem portion is to be inserted in a wall. In order to resist any tendency of the bracket to rotate under operating conditions one or more projecting ribs 20 are formed upon the outer surface of the anchoring stem portion 14. In the present instance the anchoring ribs are shown as extending substantially longitudinally of the stem. The outer portion of the stem, as shown at 21 in Figs. 2 and 3, is slightly tapered to facilitate mounting of the bracket in a wall.

This form of a bracket construction is especially adapted for manufacture from sheet metal in the following manner: A sheet metal blank, Fig. 5, is provided which is stamped or otherwise appropriately formed to provide the outstanding ribs 20 and the bead 18 extending thereacross and dividing the blank into the socket portion 13$^a$ and stem portion 14$^a$. The socket portion extends laterally beyond the edges of the stem portion, which extensions 16$^a$ provide the flanges 16 in the finished bracket. The flat blank, after being formed in this manner, is then drawn or stamped into a substantially U-shaped member (Fig. 6), after which the side edges of the stem portion may be drawn together to provide the tubular stem 14. In drawing the side edges of the stem portion together, the tubular portion of the socket will also be formed, after which the extending portions 16$^a$ are bent outwardly to form the flanges 16 in the finished article. Preferably, the outer edges of the stem portion of the blank are rounded, as at 22, to provide the tapered portion on the end of the stem when the stem is pressed into its tubular form. In so forming the stem it will be seen that the end wall on the tapered end will be inclined inwardly thereby presenting a substantially sharp, penetrating edge on the end of the stem. In this manner it will be seen that a simple bracket may be easily and economically manufactured from sheet metal by means of a comparatively few simple operating steps.

Since the shade roller 10 is not always mounted between two portions of a window casement 19, a modified form of bracket, shown in Figs. 7 to 11 inclusive, is adapted to be used when it is desired to mount a shade roller in outwardly spaced relation relatively to the casement. In this modification, the anchoring stem 14, the annular bead 18 and the projecting ribs 20 on the stem are of the same construction as embodied in the brackets used between the sides of the casement. The socket portion 13 of the bracket in this embodiment is substantially longer than the socket portion of the inside bracket to space the roller an appropriate distance from the face of the casement. As the modified bracket supports the roller 10 from a lateral position each of the projecting portions 23 on the socket portion of the blank is provided with a recessed opening 24. In forming the bracket from the blank in this modification the projecting portions 23 are drawn into juxtaposed relation in which position the openings 24 are adapted to register with each other to provide a similarly shaped opening therethrough. Thus the portions 23 provide an upstanding lug 23$^a$ and preferably the opening through the lug is substantially V-shaped in form. In this instance, one of the legs of the V near the outer end thereof is provided with an extension 25 which projects inwardly of the V to provide a stop against which the pins 11, 12 may abut to prevent accidental displacement of the shade roller from the bracket.

In the installation of the device in a wall, it will be seen that it is only necessary to determine the point at which the brackets are to be mounted, drill appropriate holes at the points selected, and then drive the brackets into position. It is, of course, contemplated that the casement or window frame may be constructed of other materials than wood as, for example, metal, composition fibre or the like, without affecting the operation of the brackets in any manner. The extent to which the brackets are driven in the wall is determined by the annular bead thereon, thereby eliminating any possibility of faulty or inaccurate mounting. This is especially true in the case of the laterally extending brackets. The outwardly projecting ribs on the anchoring stem engage the framework in which the bracket is mounted and positively prevent any accidental rotation or displacement of the bracket during the operation thereof. This is also true if the brackets are to be used in conjunction with a metal casement in which instance the projecting ribs further act to bind or wedge the bracket in the opening which has been prepared in the casement.

I claim as my invention:

1. A shade roller bracket comprising a substantially tubular socket portion having a longitudinal slot therein, a pair of outwardly extending flanges integrally connected to said socket portion at the margins of said slot, a tubular anchoring stem having a tapered outer end, an annular bead intermediate said socket portion and said tubular stem and integrally connecting one to the other, and one or more ribs projecting outwardly from the surface of said tubular stem.

2. A shade roller bracket formed from a single piece of sheet metal comprising an anchoring stem having longitudinal projections upon the outer surface thereof, and a socket portion adapted to receive either end of a shade roller in operative relation.

3. A shade roller bracket comprising a socket portion and an anchoring stem formed from a single piece of sheet metal bent upon itself, said stem being tubular in form.

4. A shade roller bracket comprising a socket portion and an anchoring stem formed from a single piece of sheet metal bent upon itself, said stem being tubular in form, and having the outer portion thereof tapered to provide a penetrating end thereon.

5. A shade roller bracket comprising a socket portion, an anchoring stem formed from a single piece of sheet metal bent upon itself, said stem being tubular in form, and an annular bead separating said socket portion and said stem to insure accurate mounting of said bracket.

6. A shade roller bracket comprising a socket portion and an anchoring stem formed from a single piece of sheet metal bent upon itself, said stem being tubular in form and having a plurality of longitudinal ribs projecting radially therefrom to prevent accidental rotational displacement of said bracket after mounting.

7. A shade roller bracket comprising a socket portion having a longitudinal slot therein with a flange extending outwardly from each side of said slot, and a tubular anchoring stem on said socket portion, flanges and stem being formed from a single piece of sheet metal bent upon itself.

8. A shade roller bracket formed from a single piece of metal bent upon itself to form a tubular anchoring stem adapted to be embedded in a supporting wall, and a socket portion at the outer end of said stem adapted to receive the end of a shade roller.

In testimony whereof, I have hereunto affixed my signature.

ELMER BROBERG.